United States Patent
Gross et al.

(10) Patent No.: US 7,239,886 B2
(45) Date of Patent: Jul. 3, 2007

(54) ADAPTIVE POWER CONTROL METHOD FOR CELLULAR SYSTEMS

(75) Inventors: Jonathan H. Gross, Gilbert, AZ (US); John M. Harris, Chicago, IL (US); Shawn W. Hogberg, Chandler, AZ (US); Daniel R. Tayloe, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 384 days.

(21) Appl. No.: 10/928,789

(22) Filed: Aug. 27, 2004

(65) Prior Publication Data

US 2006/0046735 A1    Mar. 2, 2006

(51) Int. Cl.
H04B 7/00 (2006.01)
H04Q 7/20 (2006.01)

(52) U.S. Cl. ............... 455/522; 455/452.1; 455/452.3; 455/67.11; 455/436; 455/437; 455/414.1; 370/329; 370/437; 370/332; 370/335

(58) Field of Classification Search ............ 455/452.1, 455/453, 414.1, 522, 67.11, 436, 437; 370/329, 370/437, 468, 341, 342, 332, 431, 441, 335, 370/320
See application file for complete search history.

(56) References Cited

U.S. PATENT DOCUMENTS

| | | | |
|---|---|---|---|
| 5,161,154 A * | 11/1992 | Diaz et al. ................ | 370/341 |
| 5,386,589 A | 1/1995 | Kanai | |
| 5,623,484 A | 4/1997 | Muszynski | |
| 6,072,784 A | 6/2000 | Agrawal et al. | |
| 6,084,904 A | 7/2000 | Wang et al. | |
| 6,088,335 A * | 7/2000 | I et al. ................... | 370/252 |
| 6,097,956 A | 8/2000 | Veeravalli et al. | |
| 6,219,343 B1 * | 4/2001 | Honkasalo et al. ........ | 370/335 |
| 6,434,124 B1 | 8/2002 | Rege | |
| 6,449,488 B1 * | 9/2002 | Cheng et al. .............. | 455/466 |
| 6,591,110 B1 * | 7/2003 | Kim et al. ................. | 455/453 |
| 6,816,732 B1 * | 11/2004 | Farley et al. .............. | 455/453 |
| 7,024,203 B1 * | 4/2006 | Naghian ................... | 455/453 |
| 2001/0041569 A1 * | 11/2001 | Rahman ................... | 455/436 |
| 2002/0119796 A1 * | 8/2002 | Vanghi .................... | 455/522 |
| 2003/0103470 A1 * | 6/2003 | Yafuso .................... | 370/282 |
| 2003/0133415 A1 * | 7/2003 | Kim et al. ................. | 370/235 |
| 2004/0166835 A1 * | 8/2004 | Johansson et al. ........ | 455/414.1 |
| 2004/0209624 A1 * | 10/2004 | Rune et al. ................ | 455/453 |
| 2004/0242256 A1 * | 12/2004 | Xiao et al. ................ | 455/522 |
| 2005/0107090 A1 * | 5/2005 | Hosein .................... | 455/453 |
| 2005/0107106 A1 * | 5/2005 | Valkealahti et al. ....... | 455/522 |
| 2005/0227699 A1 * | 10/2005 | Schreuder et al. ........ | 455/453 |
| 2005/0243752 A1 * | 11/2005 | Brueck et al. ............ | 370/317 |
| 2005/0286416 A1 * | 12/2005 | Shimonishi et al. ....... | 370/229 |
| 2006/0120321 A1 * | 6/2006 | Gerkis et al. ............. | 370/329 |

* cited by examiner

Primary Examiner—Matthew D. Anderson
Assistant Examiner—Sujatha Sharma

(57) ABSTRACT

A method for adaptive power control in a mobile communication system (100) determines (120) whether an RF loading factor (110) is greater than a threshold value. If the RF loading factor is above the threshold value, the method reduces call quality (140). Next, a determination is made whether the RF loading factor is below a second threshold value (150). If the RF loading factor is below the second threshold value, the call quality of the mobile communication system is increased (160).

3 Claims, 2 Drawing Sheets

ADAPTIVE POWER CONTROL METHOD FOR CELLULAR SYSTEMS

BACKGROUND OF THE INVENTION

The present invention pertains to cellular communication systems and more particularly to a method for conserving power and system capacity during peak communication system loading.

In current cellular systems, target Frame Erasure Rate (FER) settings and power control parameters are set statically and are independent of the actual load on the system which is dynamic. The FER measures dropped frames or quality of a link in a communication system.

In a CDMA system, there is a strong relationship between system capacity, RF power, interference, and call quality. As call quality is increased, the power consumed by the system tends to increase. This situation consumes available cell power which is limited, and increases system interference which in turn reduces system capacity from an RF perspective. This is a particularly important aspect of efficient CDMA systems.

Call quality in this context includes voice quality which can be measured by frame erasure rate; mean opinion score (MOS score) which is a measure of voice quality; data throughput for data services; and call reliability which includes call setup success rate and the dropped call rate. This relationship is well know to those skilled in the art. Therefore, there is a fundamental tradeoff between call performance (FER/quality, call reliability, and messaging reliability) and system capacity. As the link performance is increased FER is typically lowered, additional power is consumed, interference is generated, and capacity is reduced.

Cellular systems are therefore often tuned to handle the capacity requirements during the busiest period of the day, sacrificing call quality and reliability for additional peak capacity. A cellular system may be tuned as an aggregate. That is, the same parameters may be used statically over the entire system, even though the loading, call performance, and radio link characteristics may vary significantly over the system.

In addition, the loading characteristics can vary substantially even over short periods of time on a per cell basis. The distribution of load or call traffic over the system is in most cases highly non-uniform both temporally and geographically. This makes it difficult to optimize the tradeoffs between system capacity and call performance using static parameters relating to system capacity, power control, FER, and call quality. The current approaches are based only on achieving a given target FER. Such approaches are not based on available or utilized system capacity.

Therefore it would be highly advantageous to have a method for adaptively varying power control related parameters as a function of system load.

PREFERRED EMBODIMENT OF THE INVENTION

Figure 1:
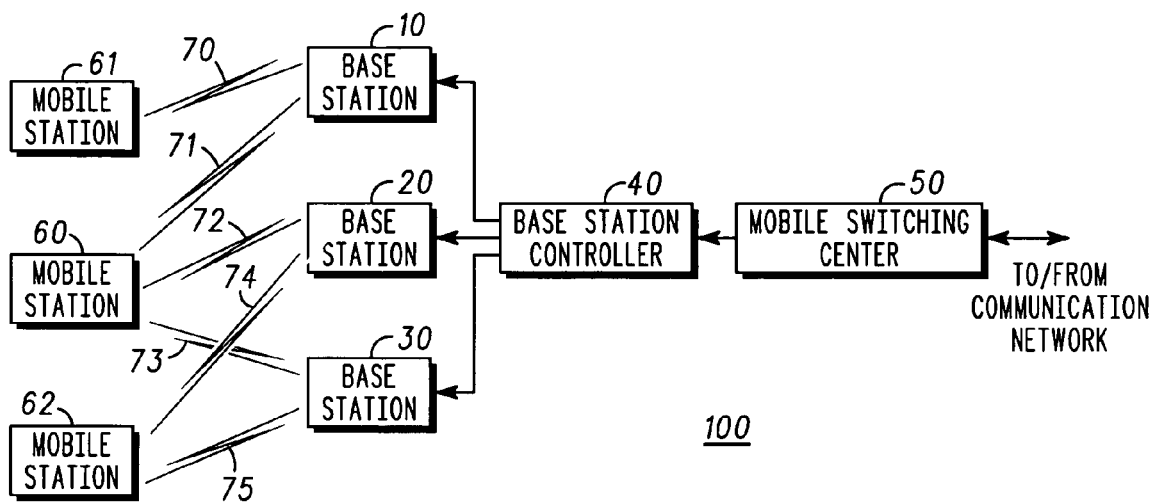
FIG. 1 is a block diagram a cellular communication system in accordance with the present invention.

FIG. 1 is a block diagram depicting a cellular communication system 100. Cellular communication system 100 includes mobile switching center (MSC) 50 coupled to base station controller (BSC) 40. Base station controller 40 is coupled to base stations (BTS) 10, 20 and 30. Base stations 10-30 are coupled to mobile stations 60, 61, and 62.

Each mobile station 60-62 is coupled to at least one of the base stations 10-30. Mobile station 60 is coupled to each base station 10-30 via mobile links 71, 72 and 73 respectively. Each of these mobile links may also be referred to as "call legs" or "soft handoff legs". Mobile station 60 is coupled to each of the base stations 10-30 since it is in "soft-handoff" (SHO) with these base stations (and thus has multiple soft-handoff legs). The base stations are constantly transmitting the same data for diversity benefits. Within a call, base stations or soft-handoff legs may be dropped and others may be added.

Mobile station 61 is coupled via mobile link 70 only to base station 10, since no soft-handoff is involved. Mobile station 62 is also in soft-handoff since it is coupled to base stations 20 and 30 via mobile links 74 and 75 respectively.

The base stations 10-30 control the power with which the mobile stations 60-62 send data on the reverse link. Similarly, mobile stations 60-62 control the power of signals transmitted by base stations 10-30 for data transmitted on the forward link.

The power transmitted by mobile stations 60-62 is of critical importance since this power is typically supplied by batteries. Transmit power is controlled on both the forward and reverse channels. That is, the base station controls the power which the mobile station transmits data to the base station and the mobile station controls the power which the base station transmits data to the mobile station.

In a CDMA-based cellular system 100, BTSs 10-30 respond to power control commands from the mobile stations, or from the Base Station Controller 40, in order to maintain a target frame erasure rate to the mobile stations 60, 61, or 62. The total amount of power transmitted by each BTS 10-30 is therefore dependent on the link conditions to each mobile, and the amount of traffic load (the number of mobile stations and their associated soft handoff legs) that each BTS is carrying.

Each BTS may have one or more sectors. Each sector may have one or more RF carriers (channels) servicing traffic.

Figure 2:
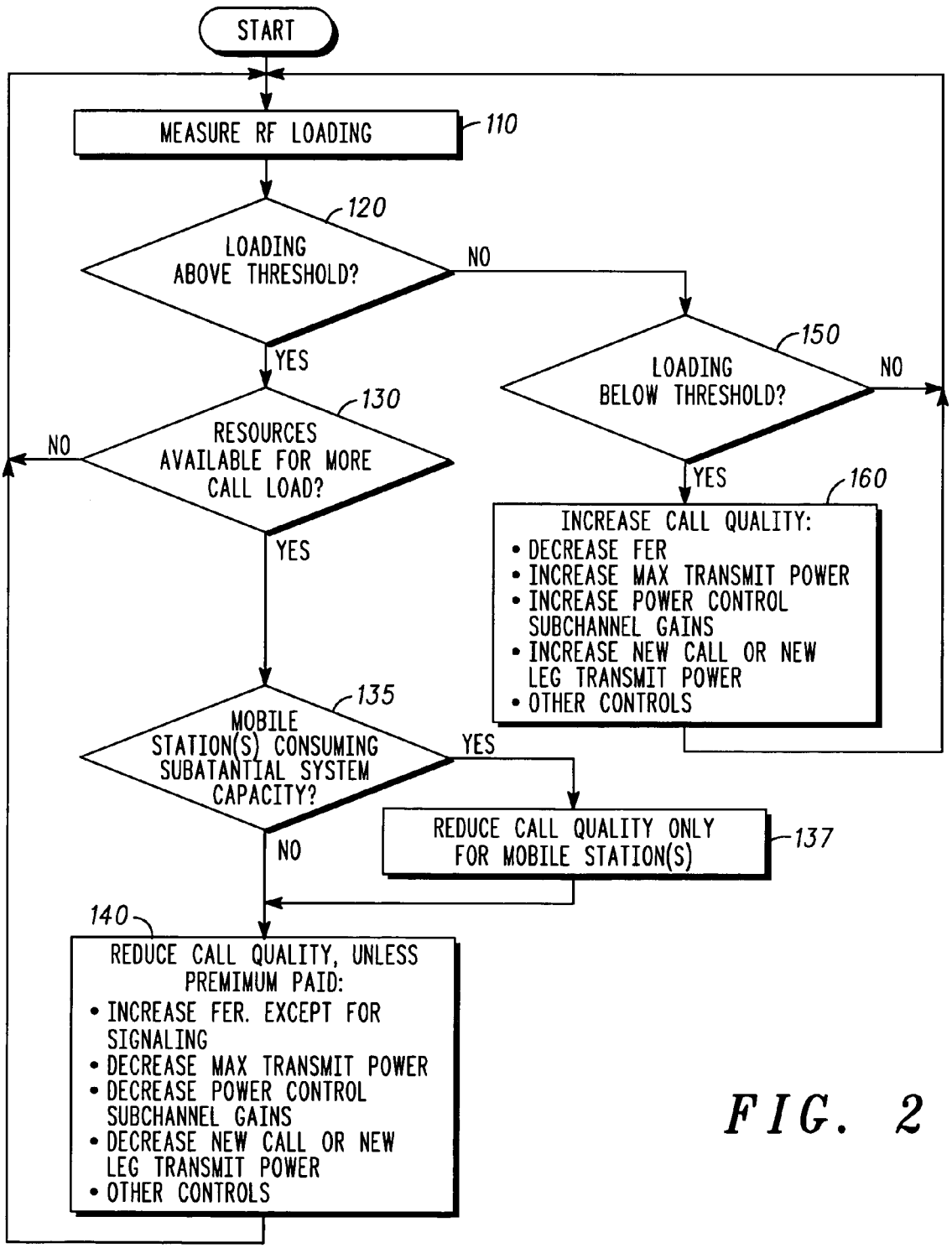
FIG. 2 is a flow chart of a method for adaptive power control in a cellular communication system in accordance with the present invention.

In the flow chart diagram of FIG. 2 the method for adaptive power control is started and block 110 measures the RF loading for each sector-carrier. BTSs 10, 20, and 30 perform this function on either a continuous or periodic basis.

The RF loading may be measured by calculating the total transmit power on the sector-carrier (Ior) relative to the sector-carrier's pilot power (Ec). The ratio of pilot power (which is fixed) to total transmit power (which varies) is referred to as Ec/Ior and is commonly used as a RF loading metric in CDMA systems. Other metrics, such as the Walsh Code loading, could also be used.

Additionally, the Base Station Controller 40 may obtain sector-carrier loading from each BTS 10, 20, or 30 via BTS-BSC messaging and combine the measurements in order to calculate a RF loading metric on a geographical region basis.

The loading metric, either for each sector-carrier, or aggregated to a geographical region basis, is then compared to a threshold. This is depicted in block 120 of FIG. 2. This comparison can be done either at the BTS 10, 20, or 30 independently, or by the BSC (Base Station Controller) 40, if the metric is geographic region based from measurements performed over multiple sector-carriers or BTSs.

Next block 120 determines whether the RF loading exceeds a defined threshold T1. If the RF loading is above T1 threshold, block 120 transfer control to block 130 via the YES path. In Block 130, the threshold, T1, used for determining whether the RF loading is too high and therefore needs to be reduced. As an example, if the Ec/Ior falls below 0.18, this would be an indicator that the sector-carrier is heavily loaded, and that additional RF capacity is needed to serve additional call load. In this case, call quality would be reduced to free up RF capacity. The threshold value T1 here are examples only, and could be tuned to achieve the desired results, the desired relationship between call quality and capacity.

Then a determination is made as to whether additional traffic handling resources, such as: sector-carrier Walsh code resources, link bandwidth between the BTSs 10-30 and BSC 40, processor and traffic channel resources at the BTS, exist to service additional call load block 130.

If insufficient resources, excluding RF capacity, exist to service additional call load, then no adjustments to call quality are made, since providing more RF capacity would not provide benefit given limitations in other system resources. And block 130 transfers control to block 110 via the NO path.

This determination, whether other resources exist to service more call load, is made either by the BTS or by the BSC, depending on whether the resource allocation is made by the BTS 10-30 or the BSC 40.

If the RF loading exceeds a defined threshold and additional traffic handling resources do exist, as determined by either the BTS 10-30, or BSC 40, or both via messaging between the two, block 130 transfers control to block 135 via the YES path. In block 135, it is determined whether a subset of mobile stations are consuming a disproportionately large amount of system resources. If so block 135 transfer control to block 137 via the YES path. Block 137 reduces the call quality for these mobile station(s) using the methodology of block 140. If a disproportionately large amount of system capacity is not being consumed by a subset of mobiles, then block 135 transfers control to block 140 via the NO path.

Then block 140 reduces call quality, unless the mobile station's user has paid a premium for high-quality service, as an option. Call quality is reduced by one or more methods in order to reduce the RF loading of the BTSs and thus provide additional RF capacity to service additional call load as explained below.

The methods for reducing call quality and RF loading block 140 include.

First, the target FER is increased, except for signaling messages. Signaling messages send critical information such as handoff direction messages and other system information between the BTS and mobile stations. Therefore, as FER is increased a gain of a predefined amount of power may be increased for signaling messages only when generally increasing the FER. The FER is increased by the BSC sending a signaling message (e.g. a power control parameters update message) to the mobile stations within the sector-carrier, or within the geographical region (depending on how the load metric is being calculated and used) telling them to increase their target FER setpoint. This causes the link from the BTS to the MS to operate at a higher frame erasure rate, which consumes less RF power, freeing up additional RF capacity within the sector-carrier, or within the geographical region, to carry additional call load.

Second, the maximum transmit power is decreased. This adjustment could be made for calls in 1-way soft handoff (single RF link to single BTS) or for calls in N-way (multiple RF links to multiple BTSs), or separately depending on SHO state (1-way, 2-way, 3-way, etc.). As the maximum transmit power for any given call is decreased, the RF loading on the BTS is decreased, and RF capacity is freed up for additional call load. This adjustment could be made by the BTS independent of the BSC (if the decision was made independently of the load on other BTSs) or could be made by the BSC if decisions were "geographical region" based, with the decision then communicated to the BTSs via messaging.

Third, the power control subchannel gains are decreased. In a CDMA system, bits are transmitted on the forward link to control the transmit power of the mobile (on the reverse link). These bits are transmitted at a gain level than is (can be) different from the rest of the data bits. As the gain is increased for these power control bits, their reliability is improved but additional transmit power (RF capacity) is consumed. As the gain for these bits is reduced their reliability is decreased but RF capacity is increased. These power control subchannel gains would be adjusted by the BSC, which would send messaging to the BTS to change the subchannel gains, and would also send messaging (e.g. power control parameters message) to the mobile station to inform it of the changes.

Fourth, the initial transmit powers for new calls or new call legs are decreased. In a CDMA system, the initial transmit power that is used for a new call (or potentially for a new SHO leg) is not based on feedback from the mobile, but is instead an initial "starting point" which is then adjusted via a closed loop mechanism (feedback from the mobile) once the link is established successfully. As the initial transmit power is increased, the probability of successfully establishing the link is improved, but RF capacity is reduced (overall transmit power is increased). As the initial transmit power is reduced, the probability of successfully establishing the link is reduced, but RF capacity is increased. These initial transmit powers could be adjusted by the BTS, or by messaging from the BSC to the BTS.

Fifth, other possibilities exist for example, adjusting handoff parameters. In a CDMA system, parameters are transmitted to the mobile for it to use as a means of determining which sectors it should request a handoff add/drop for (the mobile uses these parameters to determine if it should add a new SHO (soft-handoff) leg, or drop an existing SHO leg). The BSC of the CDMA system may also impose additional handoff state constraints (preventing a SHO leg add/drop from occurring, based on certain conditions, even if the mobile requests it—for example, preventing the mobile from having more than three soft-handoff legs, etc.). For example, as RF loading is increased, the handoff parameters could be adjusted to prevent weaker soft-handoff legs from being added to calls. As the total number of weak call legs is decreased (by making it more difficult for a mobile to add them to a call) RF loading could be decreased (less weak call legs results in less total radiated power and thus more RF capacity). This could be done by adjusting handoff add/drop/soft slope settings or by adjusting other handoff state constraints.

If the RF loading is below T1, block 120 transfers control to block 150 via the NO path. Block 150 determines whether the RF loading is below threshold, T2. Threshold, T2, is used in block 150 to determine whether the RF loading is low, and therefore that the RF loading can be increased to improve call quality. If Ec/Ior was above T2 which may be 0.25, as an example, then this would be an indicator that the sector-carrier has spare RF capacity and call quality could be increased. The threshold values here are examples only, and could be tuned by a system operator to achieve the desired results, the desired relationship between call quality and capacity.

If the RF loading is at or above threshold T2, then block 150 transfers control to block 110 via the NO path. If the RF loading is below threshold T2, block 150 transfers control to block 160 via the YES path.

The methods for increasing call quality in block 160 are similar, but opposite to the methods shown in block 140 for decreasing call quality. The methods for increasing call quality and RF loading block 160 include.

First, the target FER is decreased. This would be done by the BSC sending a signaling message (e.g. a power control parameters update message) to the mobile stations within the sector-carrier, or within the geographical region, depending on how the load metric is being calculated and used, telling them to decrease their target FER set point. This causes the link from the BTS 10-30 to the mobile station MS 60-62 to operate at a lower frame erasure rate, which consumes more RF power, consuming additional RF capacity within the sector-carrier, or within the geographical region.

Second, the maximum transmit power is increased. This adjustment could be made for calls in 1-way soft handoff (single RF link to single BTS) or for calls in N-way (multiple RF links to multiple BTSs), or separately depending on SHO state (1-way, 2-way, 3-way, etc.). As the maximum transmit power for any given call is increased, the RF loading on the BTS is increased, and additional RF capacity is consumed. This adjustment could be made by the BTS independent of the BSC, if the decision was made independently of the load on other BTSs 10-30, or could be made by the BSC 40, if decisions were "geographical region" based, with the decision then communicated to the BTSs via messaging.

Third, the power control subchannel gains are increased. In a CDMA system, bits are transmitted on the forward link to control the transmit power of the mobile (on the reverse link). These bits are transmitted at a gain level than may be different from the rest of the data bits. As the gain is decreased for these power control bits, their reliability is lessened. As the gain for these bits is increased, their reliability is increased, but the RF capacity is decreased. These power control subchannel gains would be adjusted by the BSC 40, which would send messaging to the BTS 10-30 to change the subchannel gains, and would also send messaging (e.g. power control parameters message) to the mobile station to inform it of the changes.

Fourth, the initial transmit powers for new calls or new call legs may be increased. In a CDMA system, the initial transmit power that is used for a new call, or potentially for a new SHO leg, is not based on feedback from the mobile station, but is instead an initial "starting point" which is then adjusted via a closed loop mechanism once the link is established successfully. As the initial transmit power is increased, the probability of successfully establishing the link is improved, but RF capacity is reduced. Thus call quality in increased. These initial transmit powers could be adjusted by the BTS 10-30, or by messaging from the BSC 40 to the BTS.

Fifth, other possibilities exist for example, adjusting handoff parameters. In a CDMA system, parameters are transmitted to the mobile for it to use as a means of determining which sectors it should request a handoff add/drop for the mobile uses these parameters to determine if it should add a new SHO (soft-handoff) leg, or drop an existing SHO leg. The BSC of the CDMA system may also impose additional handoff state constraints, preventing a SHO leg add/drop from occurring, based on certain conditions, even if the mobile requests it—for example, or preventing the mobile from having more than thee soft-handoff legs, etc. For example, as RF loading is decreased, the handoff parameters could be adjusted to encourage additional soft-handoff legs for increased link diversity. This could be done by adjusting handoff add/drop/soft slope settings or by adjusting other handoff state constraints.

As can be seen from the present invention, the present invention allows for dynamic and automatic tradeoff between system quality and system capacity. It allows spare off-peak CDMA system capacity to be utilized to improve call and service quality (e.g. voice quality, data throughput, call setup failure and dropped call rates.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a mobile communication system, an adaptive power control method comprising the steps of:
   determining by a network unit of the mobile communication system whether an RF loading factor is greater than a threshold value, wherein the network unit includes at least one of a base station and a base station controller;
   measuring by the network unit the RF loading factor;
   determining whether network resources are available for handling increased call loading; and
   if network resources are available, dynamically reducing a call quality to increase call loading, wherein the step of dynamically reducing call quality includes steps of:
   increasing by the network unit a frame erasure rate (FER); and
   increasing power gain for signaling messages by the network unit.

2. In a mobile communication system, an adaptive power control method comprising the steps of:
   determining by a network unit of the mobile communication system whether an RF loading factor is greater than a threshold value, wherein the network unit includes at least one of a base station and a base station controller;
   measuring by the network unit the RF loading factor;
   determining whether network resources are available for handling increased call loading; and
   if network resources are available, dynamically reducing a call quality to increase call loading, wherein the step of dynamically reducing the call quality includes a step of decreasing by a network unit a power control sub-channel gain to a mobile station.

3. In a mobile communication system, an adaptive power control method comprising the steps of:
   determining by a network unit of the mobile communication system whether an RF loading factor is less than or equal to a first threshold value, wherein the network unit includes at least one of a base station and a base station controller;
   measuring by the network unit the RF loading factor;
   if the RF loading factor is less than or equal to the first threshold value, determining by the network unit whether the RF loading factor is less than a second threshold value; and
   if the RF loading factor is less than the second threshold value, dynamically increasing a call quality, wherein the step of dynamically increasing the call quality includes a step of increasing by a network unit a power control sub-channel gain to a mobile station.

* * * * *